June 26, 1956  K. L. MAGEE  2,751,745
PICK-UP AND WINDROWING MACHINE
Filed Aug. 1, 1951  6 Sheets-Sheet 1

Fig. 1

INVENTOR.
Kenneth L. Magee
BY

ATTORNEY

June 26, 1956

K. L. MAGEE

2,751,745

PICK-UP AND WINDROWING MACHINE

Filed Aug. 1, 1951

K. L. MAGEE 2,751,745

PICK-UP AND WINDROWING MACHINE

Filed Aug. 1, 1951

INVENTOR.
KENNETH L MAGEE
BY
ATTORNEY

United States Patent Office 2,751,745
Patented June 26, 1956

2,751,745
PICK-UP AND WINDROWING MACHINE

Kenneth L. Magee, Burlington, Iowa, assignor to J. I. Case Company, Racine, Wis., a corporation of Wisconsin Application August 1, 1951, Serial No. 239,740

2 Claims. (Cl. 56—372)

The present invention relates to a pick-up and windrowing machine and more particularly to a machine for lifting an apron of vines, such as peanut vines, removing the dirt therefrom, and depositing the same in a windrow for subsequent handling, and a primary object of the present invention is to generally improve the operation and construction of machines of this class.

A further object of the present invention is to provide a machine for forming a relatively light and untangled windrow of vines, such as peanuts, which is spaced laterally of the pick-up conveyor.

Another object is to provide a deflector spaced rearwardly of the pick-up elevator and in the plane of travel thereof wherein said vines will be thrown rearwardly against said deflector with a force sufficient to disintegrate any clumps or clods of dirt clinging to the vines.

Other objects and advantages of the present invention will become apparent after a perusal of the following description and drawings wherein.

Referring to Figs. 1 through 4 of the drawings, a pick-up and windrowing machine designated generally by the numeral 10 and embodying the present invention, is shown mounted on a tractor or other suitable propelling means 11, only partly shown, by means of a mounting frame 12 as will be explained more fully hereafter. The pick-up and windrowing machine 10 comprises a movably supported frame 13 which swingably carries a pick-up elevator 14 so that the elevator extends at an inclination substantially forwardly and downwardly. An adjusting means 15 is provided on the frame 13 for swinging the pick-up elevator 14 from an operative to an inoperative or transport position and for locking the elevator against swinging movement in various adjusted positions, and a driving means 16 is connected between the pickup elevator 14 and the tractor 11 for driving the elevator in the direction indicated as will be explained hereinafter. A conveying platform 17 is carried rearwardly of the pick-up elevator 14 for conveying the apron of crop material delivered thereupon by the pick-up elevator transversely for forming a windrow laterally of the elevator, and a deflector 18 is spaced rearwardly of the pick-up elevator 14 substantially in the plane of travel thereof for disintegrating any clumps or clods of dirt clinging to the vines which are picked up and thrown rearwardly by the elevator as will be brought out presently.

Figure 10:
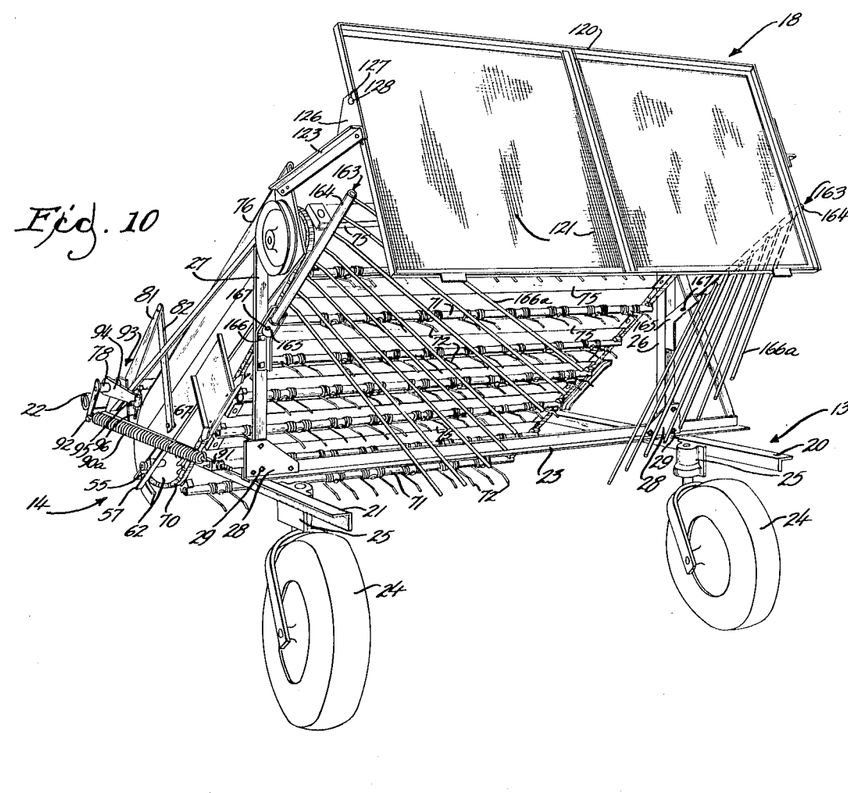
Fig. 10 is a left-rear elevational view of a different form of the present invention.

The movably supported frame 13 comprises in the present instance substantially fore and aft extending frame members 20 and 21, preferably angular shape in cross section, held in rigid parallel relationship by means of transverse members 22 and 23 which are welded between the members 20 and 21 adjacent the forward and rearward ends thereof respectively, member 22 being substantially tubular-shape in cross section while member 23 is preferably angular-shape in cross section. Caster wheels 24 of any suitable or conventional construction are journaled in suitable bearing supports 25 carried by the respective frame members 20 and 21 adjacent the rearward ends thereof for movably supporting the frame 13 as previously suggested. Substantially upwardly extending members 26 and 27, see also Fig. 10, are secured to the members 20 and 21 respectively and to the member 23 by means of suitable gussets 28 and bolts 29, members 26 and 27 swingably supporting the pick-up elevator 14 at an inclination substantially forwardly and downwardly as will be explained hereinafter.

The supporting frame 12 comprises spaced rearwardly extending members 30 rigidly secured to some convenient part of the tractor 11, preferably to the axle housing, said connections not being visible in the drawings and of no importance as far as the present invention is concerned, and the members 30 are stabilized in said rigid condition by means of a brace 30a secured to a rearwardly extending drawbar 30b of the tractor. Bearing sleeves 31 are journaled on the member 22 in spaced relationship and connecting brackets 32 are secured as by welding or the like to bearing sleeves 31. The connecting brackets are rigidly secured to the respective members 30 by means of conventional bolts or the like 33, and suitable stops 34 are secured to member 22 laterally of the respective bearing sleeves 31 for preventing axial movement of the bearing sleeves on the tubular member 22 in one direction. It will be appreciated that whereas the supporting frame 13 is rigidly held against lateral swinging movement with respect to the tractor 11 by means of the rearwardly extending members 30, vertical swinging movement of the supporting frame with respect to the tractor is permitted by rotation of the bearing sleeves 31 on the tubular member 22. It will be further appreciated that hinging the supporting frame vertically by means of the bearing sleeves 31 permits the supporting frame 13 to adjust itself with respect to irregular terrain during forward movement of the tractor.

Figure 5:
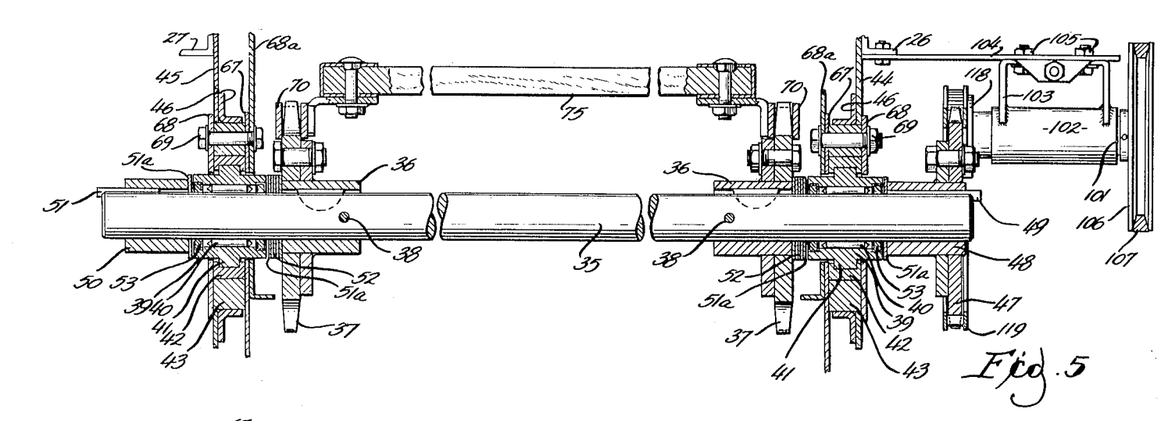
Fig. 5 is a sectional view, slightly enlarged, taken on the line 5—5 of Fig. 2 showing details of construction of the driving shaft of the pick-up elevator.

The pick-up elevator 14 comprises a driving shaft 35 which has keyed thereto in spaced relationship suitable hubs 36 which carry suitable driving sprockets 37, the hubs 36 being secured to the shaft 35 by pins 38 for preventing axial movement of the hubs, see Fig. 5. Laterally of the sprockets 37 the shaft is journaled in suitable bearings 39 having anti-friction elements 40, preferably of the needle type, in bearing relationship with the circumferential surface of the shaft, the respective bearings 39 having formed on the periphery thereof an engaging portion 41. The engaging portions 41 of the respective bearings 39 are received circumferentially by cupped bushings 42 which in turn receive circumferentially, pivot housings 43. The upwardly extending members 36 and 27 carry suitable supporting brackets 44 and 45 respectively which have formed therein openings sufficiently large to receive the respective pivot housings 43, and a flange ring 46 is secured to each of the respective brackets 44 and 45 for providing bearing surfaces for rotation of the respective pivot housings 43. A suitable driving sprocket 47 having a hub portion 48 is keyed to shaft 35 adjacent one end thereof by means of a suitable key 49, and a hub 50 is keyed by means of a key 51 to the opposite end of shaft 35. Suitable thrust washers 51a are carried on shaft 35 between the hubs 48 and 50 and the respective bearings 39 and between the opposite ends of the bearings 39 and suitable washers 52 carried on the shaft adjacent the respective sprockets 37, these thrust washers being of the non-lubricating type and preferably of the type known as a "Sauldite" in the trade. Suitable oil seals 53 of any conventional construction are provided on opposite ends of the respective bearings 39 for well known purposes.

Figure 6:
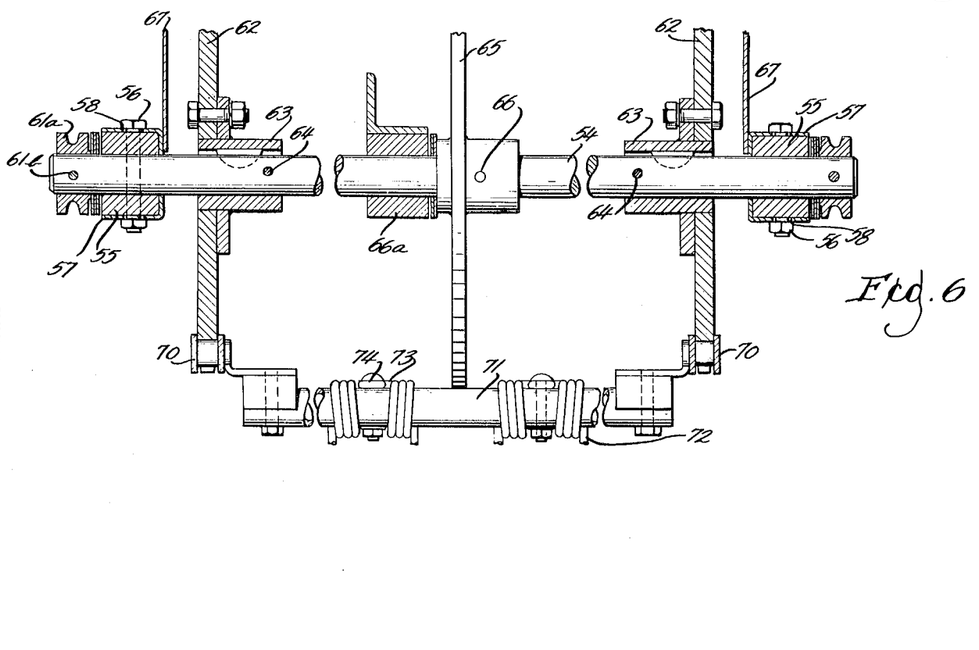
Fig. 6 is a sectional view, slightly enlarged, taken on the line 6—6 of Fig. 2 showing details in construction of the driven shaft of the pick-up elevator.

A driven shaft 54 is rotatably carried in suitable bearings 55 in spaced relation with respect to driving shaft 35, see also Fig. 6. The respective bearings 55 are secured by means of suitable bolts 56 in channel-shaped supporting members 57, the members 57 having formed therein aligned slots 58 for receiving the bolts 56 and carrying laterally extending bracket 59, Fig. 2, for receiving substantially rearwardly extending bolts 60 of the respective bearings 55. It will be appreciated that by loosening the respective bolts 56 that the bearings 55 can be moved sufficiently forwardly or rearwardly within the limits of slots 58 until the proper position for shaft 54 with respect to shaft 35 is reached. The respective bearings are then locked in this adjusted position by tightening bolts 56 and locking movement of bolts 60 with respect to brackets 59 by lock nuts 61 threaded on bolts 60 on opposite sides of brackets 59. Suitable locking means 61a are received by the opposite ends of the shaft and locked thereon by pins 61b for preventing axial displacement of the respective bearings off the shaft 54.

Driven sprockets 62 having hub portions 63 are keyed to the shaft 54 in spaced relationship and in alignment with the driving sprockets 37, and pins 64 are received by the respective hub portions 63 for preventing axial movement of the respective sprockets. A tine rod support 65 is secured to the shaft 54 substantially intermediate the sprockets 62 by means of a suitable pin 66 and is substantially cylindrical in shape and of a diameter substantially equal to the diameter of the respective driven sprockets 62 as will be more fully appreciated hereinafter and a suitable bearing 66a is supported adjacent the support 65 for aiding in supporting shaft 54.

The channel-shaped brackets 57 for carrying the bearings 55 of the driven shaft 54 are secured as by welding or the like adjacent the forward ends of a pair of side members 67, and the members 67 have formed adjacent their rearward ends, openings for receiving the respective bearings 39, Fig. 5. Retainer rings 68 are received on the opposite sides of the pivot housings 43 and suitable bolts or the like 69 rigidly secure the retainer rings 68 and side members 67 and crop defining supporting members 68a to opposite sides of the respective pivot housings 43. It will be appreciated that upon swinging movements being imparted to the side members 67, that the pivot housings 43 will turn or rotate in the flanged rings 46 so as to permit the pick-up elevator to be swung from an operative to an inoperative position.

Endless drive chains 70 are carried by the sprockets 37 and 62 and, attached to the chains 70 at spaced intervals along the links thereof are a plurality of transverse tine rods 71 which are provided to carry a plurality of pick-up fingers 72 of any suitable or conventional construction. The fingers 72 are comprised of flexible wire which is coiled around the tine-rods 71 and they have their central sections or bights 73 engaged with fastening members 74 which provide abutments for the fingers and locate them on the tine-rods during assembly. The fingers preferably have offset end portions for more efficient engagement with the vines and the fingers of one tine-rod are staggered relative to the fingers of adjacent tine-rods in order that maximum efficiency for lifting an apron of vines can be obtained. Transverse supporting members 75 preferably formed of wood, are secured to the links of the chains adjacent the tine-rods 71 for aiding in supporting the apron of vines being carried rearwardly while still permitting any dirt picked up with the vines to fall to the ground upon being shaken loose from the vines as well as aiding in stripping the apron of vines from the pick-up fingers adjacent the discharge end of the pick-up elevator.

The crop defining supporting members 68a are secured rearwardly adjacent the side members 67 as by the bolts 69 as previously suggested and forwardly the crop-defining members are secured to the respective side members by means of rivets or any other suitable means 75a so that the members move as a unitary structure. The crop-defining members 68a are bent inwardly so as to cover the chains 70, and sheet metal side walls 76 are secured as by rivets or the like 76a to the respective crop-defining members for substantially enclosing the driving chains 70 and for defining the width of the apron of vines being picked up, as well known in the art.

As previously suggested the adjusting means 15 is provided for regulating the position or inclination of the pick-up elevator 14 with respect to the ground. More specifically, the adjusting means comprises in the present instance a transverse rock shaft 78, Fig. 1, rotatably supported in suitable bearings carried in brackets 79 extending upwardly from the fore and after frame members 20 and 21 respectively adjacent forward ends thereof, said rock shaft having fixed adjacent the respective ends thereof suitable rearwardly extending rock arms 80 and 81 respectively. Links 82 are pivotally secured between the respective ends of the rock arms 80 and 81 and the corresponding side members 67 of the pick-up elevator 14, and a control lever 83 is secured by means of suitable bolts or the like 84 to a flange 85 of the rock shaft 78. The control lever 83 is swingable adjacent a rearwardly extending toothed arcuate portion 86 which is bolted by means of bolts 87 to an upwardly extending bracket 88 secured by welding or the like to the front frame member 22 of the movable frame. The control lever carries a suitable detent mechanism 89 of any conventional construction which has a resiliently urged dog 90 which engages with the teeth of the arcuate portion 86 when the detent mechanism is in an engaged position as well known in the art. It will be appreciated that the pick-up elevator 14 is biased so as to swing downwardly about the axis of the driving shaft 35 and this downward movement is prevented only by the dog 90 of the detent mechanism 89 as it engages with the teeth of the arcuate portion 86 so as to prevent swinging movement of the control lever 83 and consequently rotation of the rock shaft 78. When it is desired to move the pick-up elevator 14 into a raised or transport position, the operator, by moving the dog 90 of the detent mechanism 89 out of engagement with the teeth of the arcuate portion 86, can swing the control lever 83 forward and consequently rock the rock shaft 78 sufficiently to lift the pick-up elevator into transport position, and then, by re-engaging the dog 90 of the detent mechanism 89 between the teeth of the arcuate portion 86 so that the control lever 83 is again locked against swinging movement, the pick-up elevator 14 can be locked in said raised or transport position.

To aid in moving the pick-up elevator 14 into a raised or transport position, a suitable counterbalance spring 90a is anchored between a bracket 91 secured to the fore and aft member 21 adjacent the upwardly extending member 27 and a downwardly extending rock arm 92 fixed to the rock shaft 78 adjacent the rock arm 81. In the operation of this pick-up and windrowing machine the pick-up elevator 14, in operation, is supported at an inclination so that the lowermost pick-up fingers barely touch the ground. To permit the operator to swing the pick-up elevator 14 downwardly into an operative position without endangering the pick-up fingers, a limit stop 93 is provided, see also Fig. 10. This limit stop includes a rearwardly extending rock arm 94 fixed to the rock shaft 78 adjacent the rock arm 81. This rock arm has secured adjacent the end thereof a threaded nut 95 which receives a threaded screw 96 therein and the rock arm 94 is positioned on the rock shaft 78 so as to swing in the vertical plane of the fore and aft frame member 21. It will be appreciated that by permitting the pick-up elevator 14 to be biased or swung downwardly in a manner as previously described, that the threaded screw, upon being properly adjusted, will, upon being moved into contact with the frame member 21 prevent further downward movement of pick-up elevator 14 when the dog 90 is not engaged with the teeth of arcuate portion 86. This adjustable screw 96 can be adjusted so that the pick-up elevator 14 can be stopped from further downward swinging movement when the pick-up fingers are either just barely in contact with the ground or are positioned several inches above the ground, the condition of the vines being picked up and the condition of the ground being traversed being determinative of the setting of the adjustable screw 96.

The pick-up elevator 14 is driven in the direction indicated by the driving means 16 as previously suggested. The driving means 16 includes in the present instance a driven shaft 97 which is journaled in suitable bearings carried in a housing 98. The housing 98 is secured by means of a bracket 99 to the front frame member 22 substantially intermediate the ends thereof so as to position the driven shaft 97 substantially longitudinally with respect to movement of the machine. The driven shaft 97 has fixed adjacent the rearward end thereof a V-belt pulley 100 of any suitable construction, and adjacent the other end thereof is connected by means of a suitable universal telescopic shaft 100a to the power take-off shaft of the tractor in a manner well known in the art, said power take-off shaft not being visible in the drawings. A jack shaft 101 is rotatably journaled in a housing 102, and the housing 102 is secured as by welding or the like to an attaching bracket 103 which is adjustably carried by a supporting bracket 104 extending laterally from the upwardly extending frame member 26 and secured thereto as by bolts or the like 105, the jack shaft 101 being transverse with respect to the direction of movement of the machine. A V-belt pulley 106 is fixed adjacent the lateral end of the jack shaft 101 and is drivingly connected by means of a suitable V-belt 107 to the pulley 100 of the driven shaft 97. Adjacent the right end of the transverse frame member 22 is secured as by welding or the like a suitable supporting bracket 108 which has formed therein transverse slots 109. A substantially channel shaped bracket 110 is carried by the bracket 108 by means of bolts 111 which are received by the respective slots 109 so as to permit the channel shaped bracket to be moved within the limits of the slots when the respective bolts are loosened. A slot 112 is formed in the bracket 108 and a pin 113 extending forwardly from the channel shaped bracket 110 is received by the slot 112. An eye bolt 114 is secured to the pin 113 and extends inwardly for locking the bracket 110 in adjusted position by means of lock nuts 115 on opposite sides of a flange of the supporting bracket 108 as well known in the art. Suitable V-belt pulleys 116 and 117 are rotatably supported by the bracket 110 in spaced relationship, the respective pulleys being so positioned with respect to the pulley 100 and the pulley 106 as to change the direction of travel of the V-belt 107. More specifically the V-belt 107 is trained around the pulley 100 and extends laterally therefrom whence it is trained around the pulley 116.

The pulley 116 changes the direction of travel of the V-belt 107 and directs the same rearwardly in alignment with pulley 106 the belt being trained around pulley 106 and then forwardly and around the pulley 117 so as to again extend transversely in alignment with the pulley 100. Adjacent the inner end of the jack shaft 101 is fixed a driving sprocket 118 which is positioned in substantially vertical alignment with the driven sprocket 47 of the driving shaft 35 and a suitable endless chain 119 is trained around these respective sprockets for imparting the rotary motion of the jack shaft 101 to the driven sprocket 47 and subsequently to the driving shaft 35.

The deflector 18 is spaced rearwardly from the discharge end of the pick-up elevator 14 as previously suggested and comprises in the present instance a substantially rectangular framework 120 preferably formed of angle irons or other suitable structural members, and a suitable meshed material such as wire 121 or the like is secured to the rectangular frame so as to provide a deflecting surface therefor. The rectangular frame 120 is swingably carried by inwardly extending pins 122 of supporting arms 123, the pins 122 being received in aligned slots 124 formed in the rectangular frame 120. The supporting arms 123 are secured to the respective supporting brackets 44 and 45 in substantially parallel rearwardly inclined position by means of bolts or the like 125, and locking plates 126 provided with slots 127 are secured to the respective supporting arms 123 adjacent the rearward ends theerof. The rectangular frame 120 has laterally extending pins 128 which are received by the slots 127 of the locking plates 126 for locking the deflector against swinging about the pins 122 in its properly inclined position with respect to the pick-up elevator 14. It will be appreciated that the deflector 18 can be tilted about the pins 122 by exerting a force upwardly against the deflector sufficiently to move the pins 128 out of engagement with the slots 127, the deflector being then free to swing about the pins 122 between the supporting arms 123. The supporting arm 123 adjacent the supporting bracket 45 is provided with downwardly extending fingers 129 for preventing the discharge of vines in a direction laterally of said fingers as will be more fully appreciated hereinafter.

The conveying platform 17 is carried rearwardly of the pick-up elevator 14 and below the deflector 18 for conveying the apron of vines delivered thereupon transversely for forming a windrow laterally of the pick-up elevator as previously suggested. The conveying platform is formed in the present instance of channel-shaped side members 130 and 131 which are rigidly held in parallel spaced relationship, and adjacent the respective ends of the members 130 and 131 are journaled in suitable bearings 132 substantially parallel and fore and aft extending shafts 133 and 134, the driving shaft 134 having fixed thereon spaced driving sprockets 135 which are in alignment with driven sprockets 136 fixed to the driven shaft 133, see also Figs. 7 and 8. The aligned sprockets receive endless chains 137 of any suitable or well-known construction and secured between the links of the chains are spaced substantially parallel push bars 138 for moving the material, such as peanut vines, in one direction. An open slatted bottom 139 is so positioned between the respective shafts 133 and 134 that the push rods urging the vines in one direction operate on the open slatted bottom, this bottom providing means wherein loose dirt discharged downwardly by the deflector 18 along with the vines can filtrate downwardly through the slatted bottom and fall upon the ground instead of in the windrow being formed. The channel shaped member 130 is provided with depending brackets 140 which have formed therein downwardly and rearwardly extending slots 141. The channel shaped member 131 has secured thereto as by welding or the like suitable angular shaped tabs 142.

Figures 3, 9:
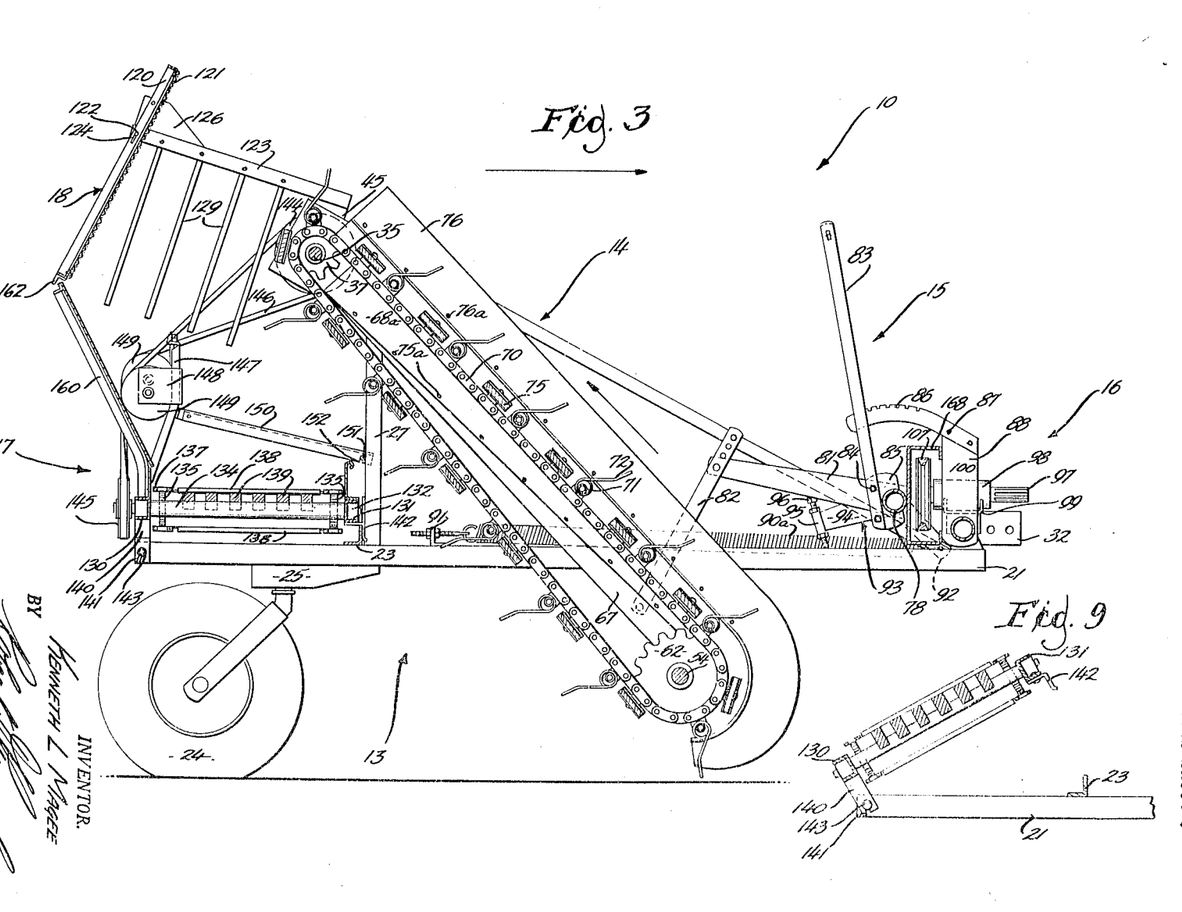
Fig. 3 is a right-side cross sectional view of the machine shown in Fig. 2.
Fig. 9 is a view showing certain structure of Fig. 3, illustrating the installation of the conveying platform on the movably supported frame.
Figures 4, 7, 8:
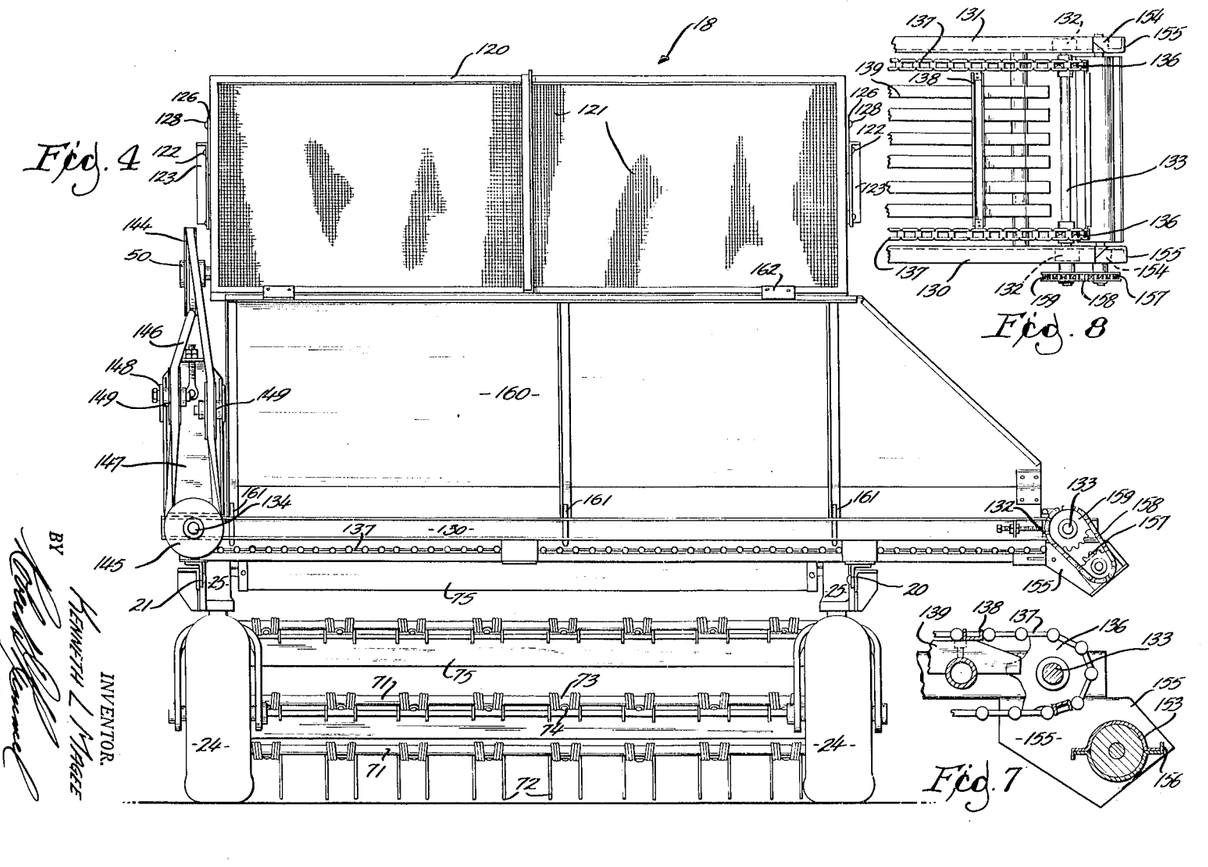
Fig. 4 is a rear view of the machine shown in Fig. 2.
Fig. 7 is a slightly enlarged cross sectional view of certain mechanism shown in Fig. 4.
Fig. 8 is a slightly enlarged plan view showing the discharge end of the conveying platform shown in Fig. 4.

The fore and aft extending frame members 20 and 21 have fixed adjacent the rearward ends thereof laterally extending pins 143 and the conveying platform 17 upon being tilted upwardly and rearwardly, see Fig. 9, can receive the pins 143 in the slots 141 of the brackets 140. After the pins 143 are received by the slots 141 the conveying platform can be swung downwardly until the tabs 142 are supported by the rear transverse frame member 23, the conveying platform being then supported in a substantially horizontal position. For driving the shaft 134 and consequently the chains 137 and push rods 138, a V-belt pulley 144 is fixed to the hub 50 of the driving shaft 35 and a V-belt pulley 145 is fixed to the rearward end of the shaft 134. A V-belt 146 is trained around the pulley 144 and the pulley 145 and a belt tightener 147 including a bracket 148 rotatably carrying a pair of laterally spaced V-belt pulleys 149 is swung rearwardly against the V-belt 146. Sufficient slack is allowed in the V-belt 146 so that upon tightening the belt as by a link 150 engaging a pin 151 carried by the upwardly extending member 27 in a slot 152, the pulleys 149 are moved sufficiently rearwardly to be in substantially vertical alignment with the pulley 145. It will be appreciated that upon rotation of the driving shaft 35 of the pick-up elevator 14, that the pulley 144 will be driven in a like direction so as to drive the pulley 145 so that the push rods move so as to urge the vines to the right toward the discharge end of the platform.

Adjacent the discharge end of the conveying platform 17 is rotatably carried a stripping roll 153 in suitable bearings 154 laterally spaced from the driven shaft 133 by means of laterally extending brackets 155 secured to the channel shaped members 130 and 131 respectively. The stripping roll 153 is provided with a plurality of substantially radially extending flanges 156 and a driving sprocket 157 is fixed to the rearward end of the stripping roll 153 and is drivingly connected by means of a suitable driving chain 158 to a driving sprocket 159 fixed to the rearward end of the shaft 133 in alignment with the sprocket 157. It will be appreciated that upon rotation of the driving shaft 134, in a manner as previously described, that the driven shaft 133 will be rotated in the same direction by means of chains 137 and consequently the stripping roll 153 will be rotated in the same direction as shaft 133, the stripping roll 153 stripping the vines off the discharge end of the conveying platform in a manner well known in the art.

A suitable upwardly extending shield 160 having downwardly extending locking pins 161 is carried by the channel shaped member 130 and is positioned thereon by insertion of the locking pins 161 in aligned openings formed in the channel shaped member 130, the shield being so positioned as to deflect any vines or other like material picked up by the pick-up elevator 14 from being thrown rearwardly beyond the conveying platform 17 and the deflector 18. The deflector as previously suggested is capable of being tilted into an out-of-the-way position so that upon installing the conveying platform 17 and the shield 160 upon the machine in a manner as previously suggested, the deflector 18 upon being tilted allows the operator sufficient space to work in. The deflector is also provided with suitable tabs 162 which overlap the shield 160 when the deflector is locked in its proper position.

In operation the driving shaft 35 is driven at a speed sufficient to throw the apron of vines picked up by the pick-up fingers 72 rearwardly against the deflector with a force sufficient to disintegrate any clods or clumps of dirt clinging to the vines, a goodly portion of this dirt upon being disintegrated passing through the meshed deflecting surface 121. The vines upon contact with the deflector 18 are deflected downwardly upon the conveying platform 17 whereupon they are urged to the right by the push rods 138, the dirt which did not pass through the meshed deflecting screen 121 being filtered so as to pass through the slatted bottom 139 rather than being thrown into the resulting windrow which is formed to the right of the pick-up elevator 14.

In the embodiment of the invention shown in Fig. 10, the conveying platform 17 together with the shield 160 have been removed from the machine and gathering grates 163 are provided for forming a windrow rearwardly of the pick-up elevator 14. More specifically the gathering grates 163 include in the present instance rearwardly extending supporting posts 164 which are carried by post holders 165 which in turn are secured as by bolts or the like 166 to the upwardly extending members 26 and 27 respectively, the supporting posts 164 having fixed thereto inwardly extending fingers 166a for receiving the vines being deflected downwardly by the deflector 18, in a manner as previously described. Suitable pins 167 are inserted in the post holders 165 and the supporting posts 164 for locking the posts 164 against rotation therein.

Figure 1:
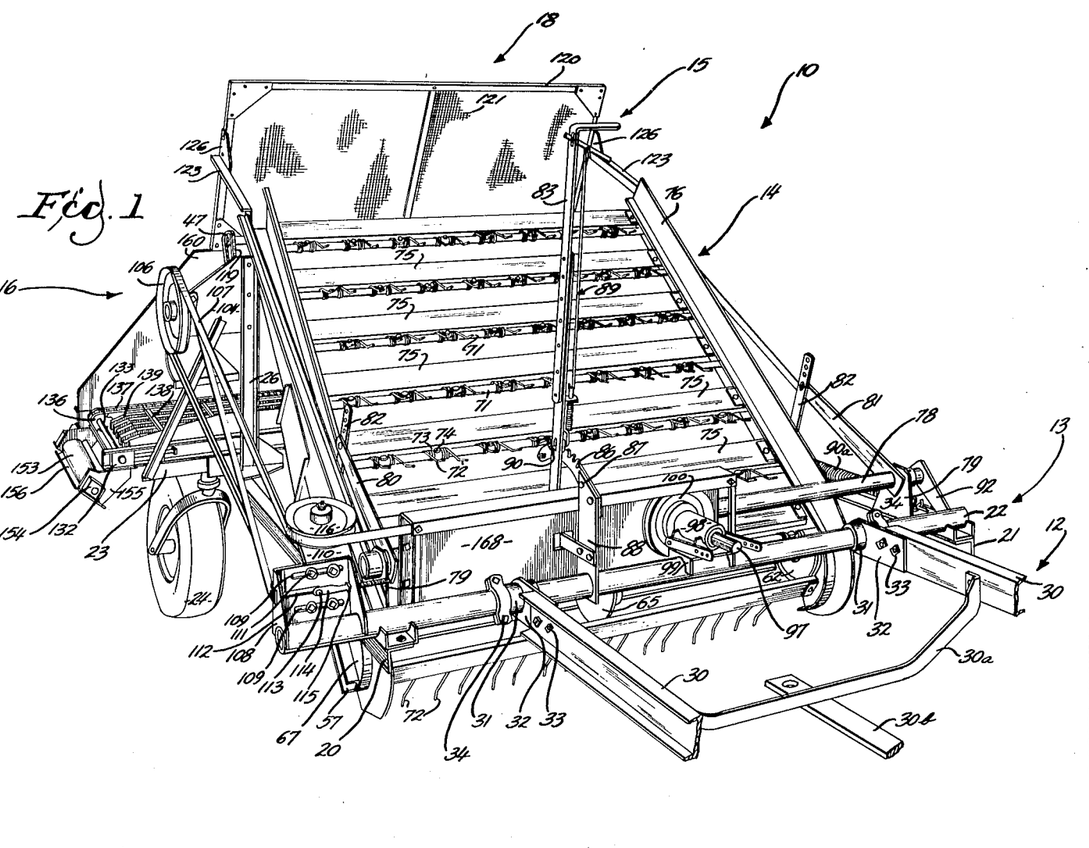
Fig. 1 is a right-front elevational view of a pick-up and windrowing machine embodying the present invention, being shown connected to the mounting frame, with parts removed.
Figure 2:
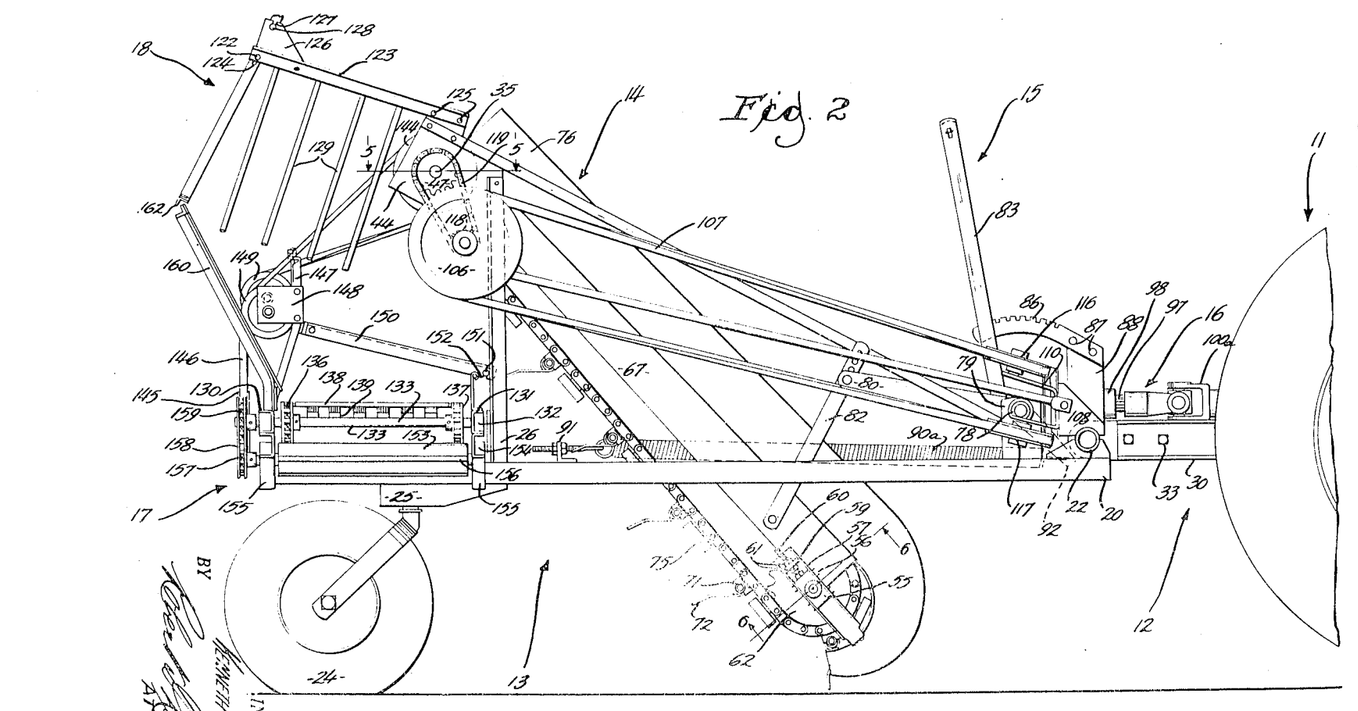
Fig. 2 is a right-side elevational view of the machine shown in Fig. 1, with parts in section, operatively connected to a tractor, only partly shown.

A suitable sheet metal housing 168, Fig. 1, is carried by the front frame member 22 for enclosing that portion of the V-belt 107 adjacent the pick-up portion of elevator 14 for preventing the possibility of the vines' becoming entangled with the V-belt 107.

These and other modifications will now be apparent to those skilled in the art, and it is expressly understood that all such modifications are within the comprehension of the present invention.

What is claimed is:

1. An agricultural machine for lifting, shaking, and depositing an apron of crop material in a windrow comprising a movably supported frame adapted to be drawn by a propelling means, a pick-up elevator carried by the frame and extending at an inclination forwardly and downwardly, said pick-up elevator being provided with spaced pick-up fingers, the lowermost fingers being positioned in substantially close proximity to the ground, a conveying platform carried transversely on the movably supported frame rearwardly of said pick-up elevator for receiving the apron of crop material delivered rearwardly by said pick-up elevator, a conveying device on said conveying platform for moving crop material deposited thereon in one direction for forming a windrow laterally of said pick-up elevator, means for driving said pick-up elevator and said conveying device, a deflector rearwardly spaced from said pick-up elevator substantially in the plane thereof and transverse with respect thereto and above said conveying platform wherein said pick-up elevator is driven at a speed sufficient to throw the apron of crop material rearwardly across the space between said elevator and said deflector against said deflector with a force sufficient to disintegrate any dirt clinging to said crop material, said crop material being deflected downwardly upon said conveying platform by said deflector, a stripping roll rotatably carried by said conveying platform adjacent the discharge end of said conveying device, and means for driving said stripping roll in a direction of rotation corresponding to the movement of said conveying device for stripping the apron of crop material thrown laterally by said conveying device.

2. An agricultural machine for lifting, shaking and depositing an apron of crop material in a windrow comprising a movably supported frame adapted to be drawn by a propelling means, a pick-up elevator carried by the frame and extending at an inclination forwardly and downwardly, said pick-up elevator being provided with spaced pick-up fingers, the lowermost fingers being positioned in substantially close proximity to the ground, a conveying platform carried transversely on the movably supported frame rearwardly of said pick-up elevator for receiving the apron of crop material delivered rearwardly by said pick-up elevator, a conveying device on said conveying platform for moving crop material deposited thereon in one direction for forming a windrow laterally of said pick-up elevator, means for driving said pick-up elevator and said conveying means, and a deflector rearwardly spaced from said pick-up elevator substantially in the plane thereof and transverse with respect thereto and above said conveying platform wherein said pick-up elevator is driven at a speed sufficient to throw the apron of crop material rearwardly across the space between said elevator and said deflector against said deflector with a force sufficient to disintegrate any dirt clinging to said crop material, said crop material being deflected downwardly upon said conveying platform by said deflector.

References Cited in the file of this patent

UNITED STATES PATENTS

| | | |
|---|---|---|
| 412,294 | Renard | Oct. 8, 1889 |
| 488,732 | Ferguson | Dec. 27, 1892 |
| 660,944 | Bowen | Oct. 30, 1900 |
| 1,052,249 | Hewitt | Feb. 14, 1913 |
| 2,542,446 | Abel | Feb. 20, 1921 |
| 1,381,009 | Pratt | June 7, 1921 |
| 1,718,774 | Bullis | June 25, 1929 |
| 1,902,383 | Sishc | Mar. 21, 1933 |
| 2,367,970 | Smoker | Jan. 23, 1945 |
| 2,472,762 | Sage | June 7, 1949 |
| 2,499,051 | Beaver | Feb. 28, 1950 |
| 2,607,489 | Seeling | Aug. 19, 1952 |

FOREIGN PATENTS

| | | |
|---|---|---|
| 273,488 | Germany | Apr. 30, 1914 |
| 405,688 | Great Britain | Feb. 12, 1934 |
| 920,086 | France | Dec. 16, 1946 |